United States Patent
Rhoades et al.

(10) Patent No.: US 8,954,691 B2
(45) Date of Patent: *Feb. 10, 2015

(54) IDENTIFYING UNALLOCATED MEMORY SEGMENTS

(71) Applicant: Juniper Networks, Inc., Sunnyvale, CA (US)

(72) Inventors: Robert Rhoades, San Jose, CA (US); Paul Kim, Fremont, CA (US); Gary Goldman, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/770,350

(22) Filed: Feb. 19, 2013

(65) Prior Publication Data

US 2013/0166859 A1 Jun. 27, 2013

Related U.S. Application Data

(63) Continuation of application No. 12/911,012, filed on Oct. 25, 2010, now Pat. No. 8,392,672.

(51) Int. Cl.
*G06F 12/00* (2006.01)
*H04L 12/879* (2013.01)

(52) U.S. Cl.
CPC .............. *H04L 49/901* (2013.01); *G06F 12/00* (2013.01)
USPC ............................ 711/156; 711/145; 711/202

(58) Field of Classification Search
CPC G06F 12/0223; G06F 12/0631; G06F 12/128
USPC .......................................... 711/145, 156, 202
See application file for complete search history.

(56) References Cited

U.S. PATENT DOCUMENTS

2002/0085433 A1 7/2002 Tomori et al.
2010/0169322 A1* 7/2010 Selvaraj .......................... 707/745

OTHER PUBLICATIONS

Co-pending U.S. Appl. No. 12/911,012, filed Oct. 25, 2010, entitled "Identifying Unallocated Memory Segments (as amended)," by Robert Rhoades et al., 56 pages.

* cited by examiner

*Primary Examiner* — Gurtej Bansal
(74) *Attorney, Agent, or Firm* — Harrity & Harrity, LLP

(57) ABSTRACT

A network device that includes a first memory to store packets in segments; a second memory to store pointers associated with the first memory; a third memory to store summary bits and allocation bits, where the allocation bits correspond to the segments. The network device also includes a processor to receive a request for memory resources; determine whether a pointer is stored in the second memory, where the pointer corresponds to a segment that is available to store a packet; and send the pointer when the pointer is stored in the second memory. The processor is further to perform a search to identify other pointers when the pointer is not stored in the second memory, where performing the search includes identifying a set of allocation bits, based on an unallocated summary bit, that corresponds to the other pointers; identify another pointer, of the other pointers, based on an unallocated allocation bit of the set of allocation bits; and send the other pointer in response to the request.

20 Claims, 6 Drawing Sheets

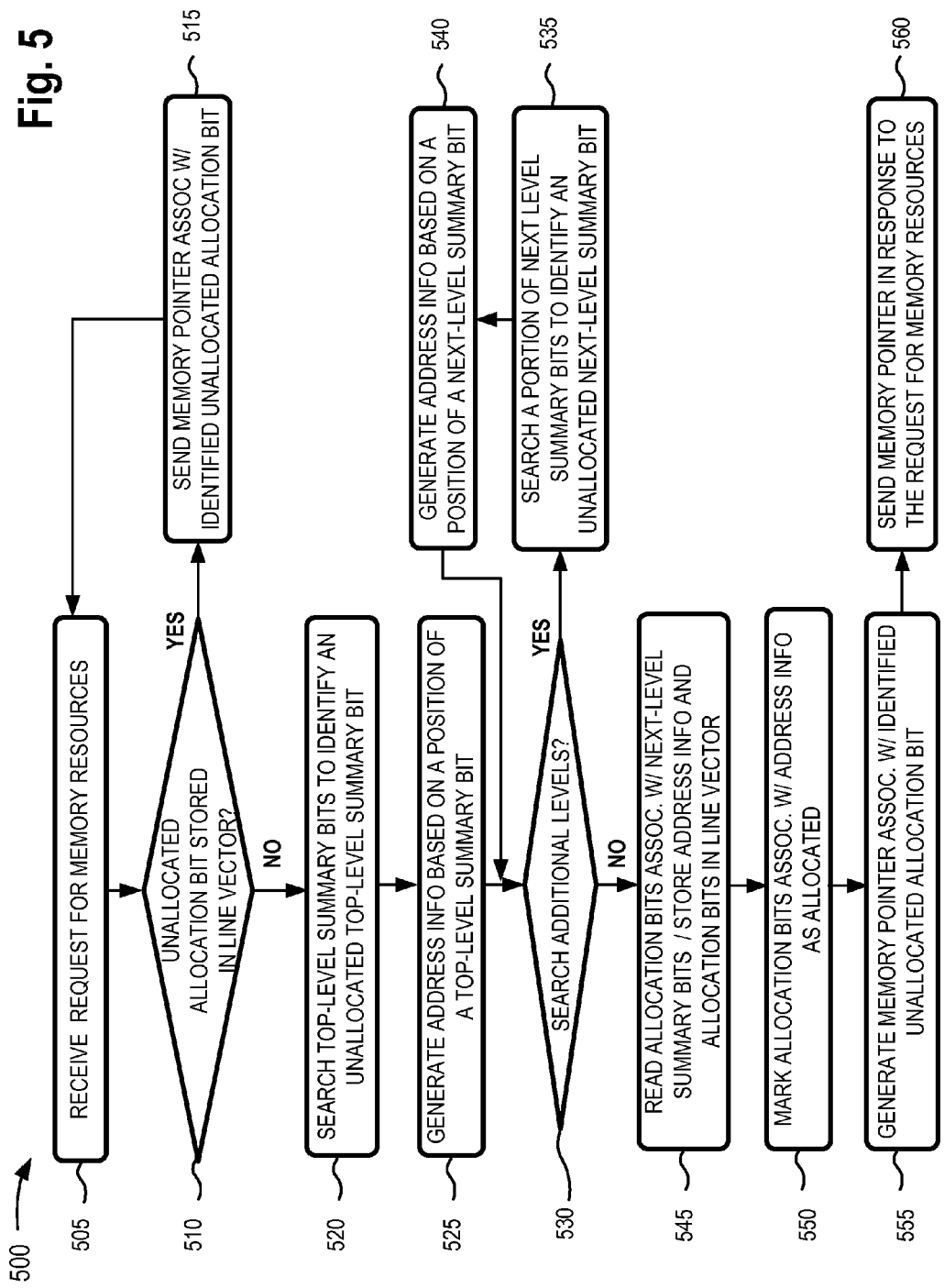

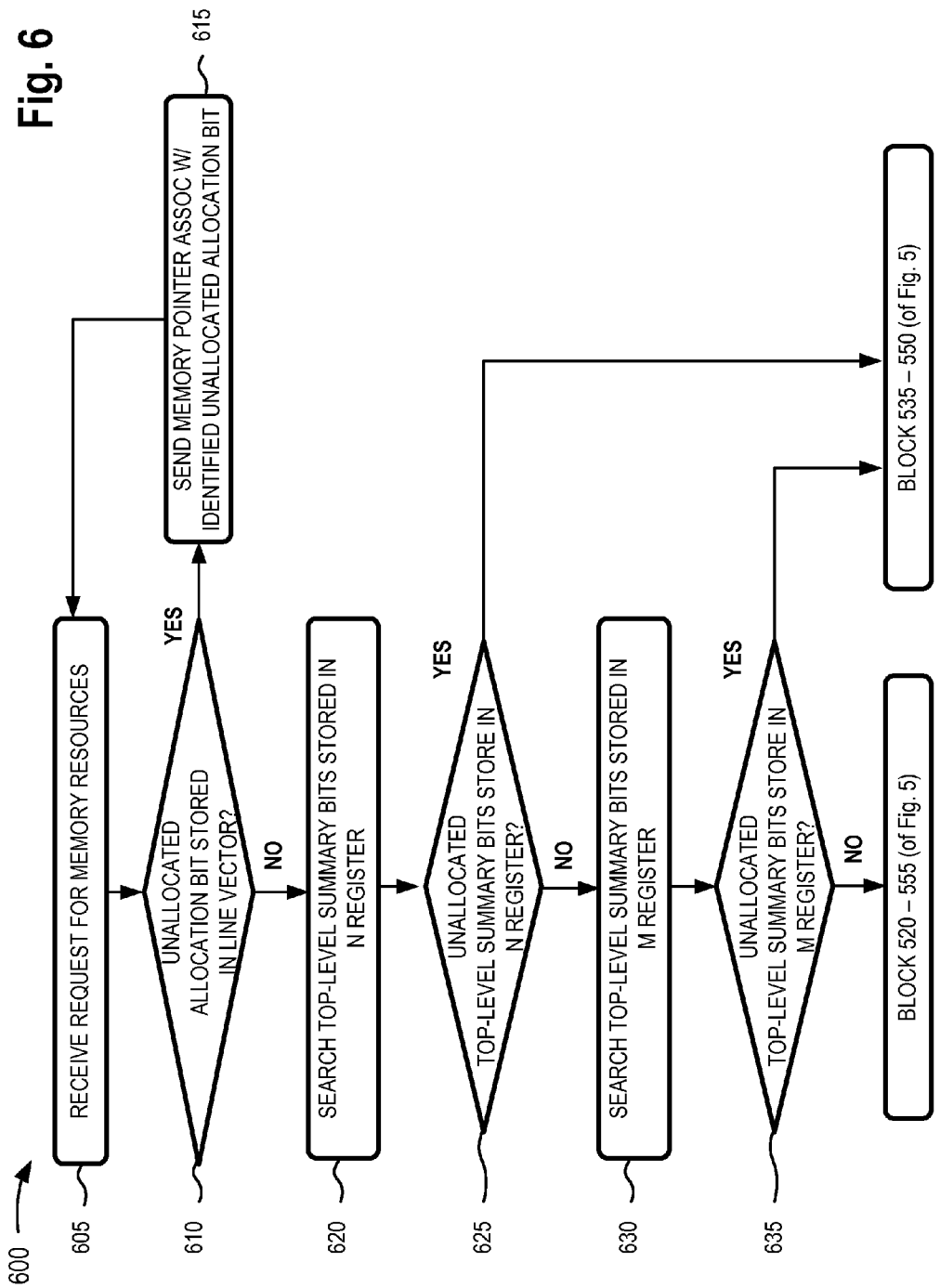

IDENTIFYING UNALLOCATED MEMORY SEGMENTS

RELATED APPLICATION

This application is a continuation of U.S. patent application Ser. No. 12/911,012, filed Oct. 25, 2010, the disclosure of which is incorporated herein by reference.

BACKGROUND

Computing and communication networks typically include network devices, such as routers, firewalls, switches or gateways, which transfer or switch data, such as packets, from one or more sources to one or more destinations. Network devices may operate on the packets as the packets traverse the network, such as by forwarding or filtering the packet-based network traffic. Packets may be temporarily stored in queues as packets move through the network devices.

While processing packets, a network device may allocate memory resources that enable the packets to be temporarily stored in a memory (e.g., a queue, a buffer, etc.) and may deallocate memory resources when the temporarily stored packets are read from the memory and/or outputted by the network device. For example, the network device may temporarily store packets by first performing a search to identify a location (e.g., an address, a pointer, etc.), within the memory, at which to temporarily store the packets. Often times, however, a quantity of searches to be performed by the network device and/or a period of time associated with performing a search may cause the network device to process packets in a manner that disrupts a network service, reduces a quality of service associated with the network, and/or causes congestion on the network.

SUMMARY

According to one aspect, a method may be performed by a network device. The method may include receiving, from an input/output (I/O) device associated with the network device, a request to temporarily store packet information in a first memory associated with the network device; and searching, by the network device and in response to the request, a group of summary bits, stored in second memory associated with the network device, to identify a set of unallocated summary bits, of the group of summary bits, stored in the second memory. The set of unallocated summary bits may correspond to a plurality of allocation bits and may indicate that the group of allocation bits includes at least one unallocated allocation bit. The method may also include generating, by the network device, a first address associated with the at least one unallocated summary bit; and reading, by the network device and from the other memory, the group of allocation bits based on the first address. The method may further include generating, by the network device, a second address associated with an unallocated allocation bit of the at least one unallocated allocation bit; identifying, by the network device, the storage address associated with the first memory based on the first address and the second address; and sending, by the network device and to the I/O device, the storage address that enables the I/O device to store the packet information in the first memory.

According to another aspect, a network device may include a first memory to temporarily store packet information; a second memory to store a group of top-level summary bits, a group of bottom-level summary bits, and a group of allocation bits, where the group of allocation bits corresponds to a group of segments associated with the first memory. The network device may also include a processor to receive, from an input/output (I/O) controller, a request to temporarily store packet information; and perform, in response to the request, a first search to identify an unallocated top-level summary bit, from the group of top-level summary bits, where the unallocated top-level summary bit may correspond to two or more bottom-level summary bits of the group of bottom-level summary bits. The processor may also perform a second search to identify an unallocated bottom-level summary bit from the two or more bottom-level summary bits, where the unallocated bottom-level summary bit may correspond to two or more allocation bits of the group of allocation bits; and read, from the second memory, the two or more allocation bits of the group of allocation bits. The processor may also identify an unallocated allocation bit, of the two or more allocation bits, where the unallocated allocation bit corresponds to a segment, of the plurality of segments, that is available to temporarily store packet information; and send, to the I/O controller, a memory address associated with the segment.

According to still another aspect, a network device may perform an allocation operation that includes a first memory to store packet information in a group of segments; a line vector memory to store a set of pointers associated with the first memory; a second memory to store a group of summary bits and a group of allocation bits, where the group of allocation bits may correspond to the group of segments. The network device may also include a processing unit to receive a request for a pointer associated with the first memory; determine, in response to the request, whether an unused pointer, of the set of pointers, is stored in the line vector memory, where the unused pointer may correspond to a segment, of the group of segments, that is available to store packet information; and send the unused pointer when the unused pointer is stored in the line vector memory. The processing unit may also perform a search to identify another set of pointers when the unused pointer is not stored in the line vector memory. The search may include identifying an unallocated summary bit, of the group of summary bits, where the unallocated summary bit may correspond to one or more allocation bits, of the group of allocation bits, and storing, in the line vector memory, the one or more allocation bits, that may correspond to the other set of pointers. The processing unit may also identify another unused pointer, of the other set of pointers, that are stored in the line vector memory; and send the identified unused pointer in response to the request.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 5 is a flow chart of an example process for responding to an allocation request; and FIG. 6 is a flow chart of another example process for responding to an allocation request.

DETAILED DESCRIPTION

Figure 1:
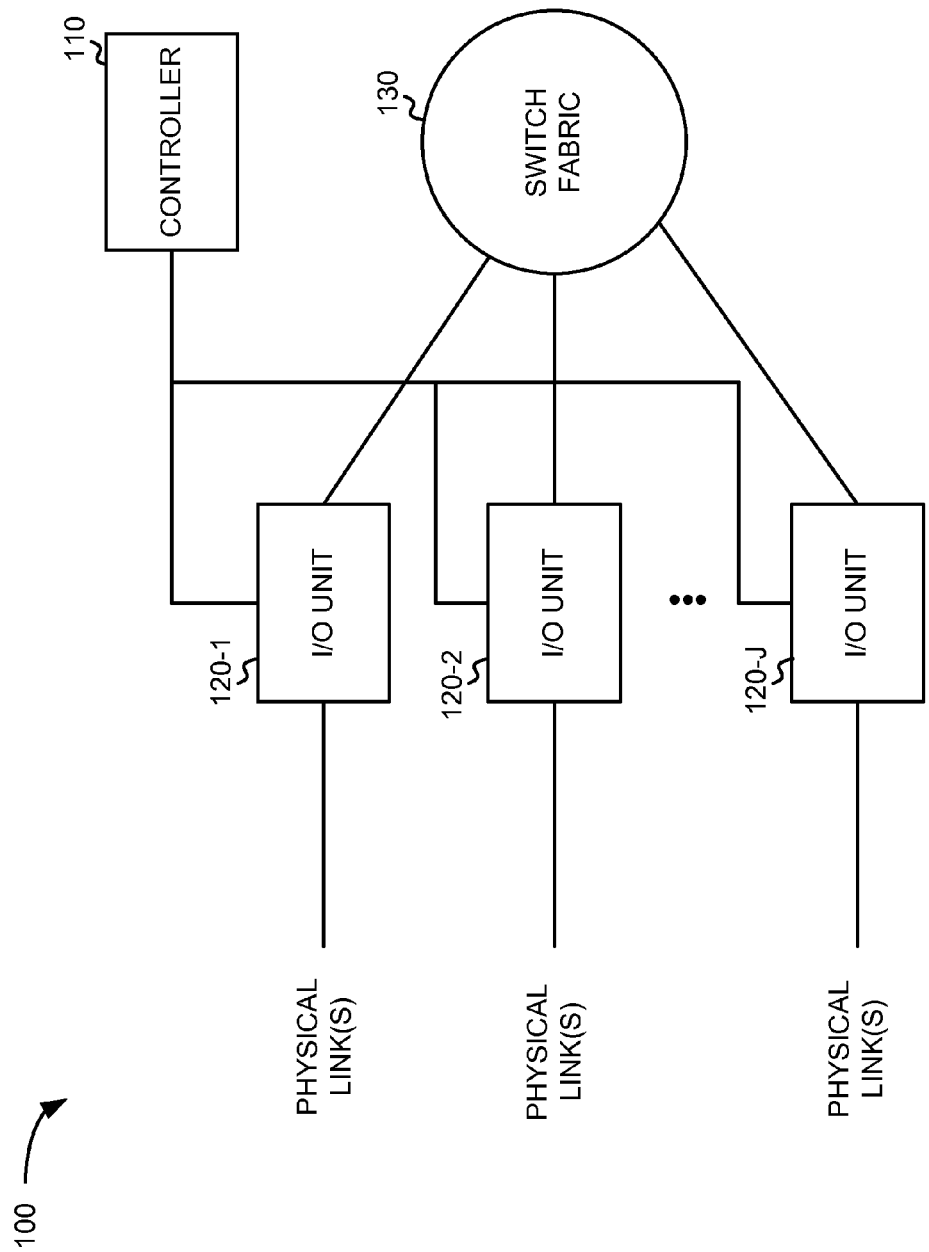
FIG. 1 is a diagram of an example network device in which systems and/or methods described herein may be implemented.

The following detailed description refers to the accompanying drawings. The same reference numbers in different drawings may identify the same or similar elements. Also, the following detailed description does not limit the invention.

Systems and/or methods, described herein, may provide a memory search, allocation, and deallocation system that enables a network device to process packet-based network traffic in a manner that reduces an amount of time and/or utilization of bandwidth resources associated with temporarily storing packets being processed by the network device. An allocation-deallocation processing system (APS) may handle the provisioning and/or control of memory resources using allocation bits associated with a memory within which the packets and/or packet information are temporarily stored. The allocation bits may correspond to various regions and/or segments of memory and may be used, by the APS, to identify whether segments within the memory have been allocated (e.g., are being used to temporarily store packet data and are thus unavailable) or are unallocated (e.g., empty and/or otherwise not being used to temporarily store packet data and are thus available). The APS may use summary bits to perform searches for unallocated segments within the memory. The summary bits may correspond to the allocation bits and may be configured in a manner that reduces the steps associated with a search and/or the time associated with a search.

The APS may perform a single search operation to identify a quantity of available memory locations (e.g., memory storage locations, memory pointers, etc.). Performing the single search operation to identify the quantity of available memory locations may reduce the time and/or utilization of bandwidth resources associated with performing a search operation for each of the memory locations and/or in response to each request for memory resources. Also, as a result of the search operation, the APS may store a quantity of pointers that correspond to a quantity of available memory locations. The quantity of memory pointers (sometimes referred to as a "line vector"), may be stored in another memory, a register, a set of flip flops, and/or some other storage device. In response to a request to temporarily store packet information, the APS may not perform a new search. Rather, the APS may read a memory pointer from the line vector (e.g., stored in a line vector register) and may dispatch the memory pointer to a client to be used to temporarily store the packet information in the memory.

Additionally, or alternatively, when the quantity of available memory locations are identified and/or stored as described above, the APS may mark the quantity of available locations as allocated (e.g., unavailable), which may effectively "reserve" the memory locations until a later point in time when the memory locations become available (e.g., when the APS deallocates locations).

The term "packet information" as used herein, may refer to a packet, a datagram, a data item, or a cell; a fragment of a packet, a fragment of a datagram, a fragment of a data item, a fragment of a cell; or another type, arrangement, or packaging of data.

FIG. 1 is a diagram of an example network device 100 in which systems and/or methods described herein may be implemented. In this example implementation, network device 100 may take the form of a router, although the systems and/or methods herein may be implemented in another type of network device. For example, network device 100 may include another data transfer device, such as a gateway, a switch, a firewall, a network interface card (NIC), a hub, a bridge, a proxy server, an optical add-drop multiplexer (OADM), or some other type of device that processes and/or transfers traffic.

Network device 100 may receive network traffic, as one or more packet stream(s), from physical links, may process the packet stream(s) to determine destination information, and may transmit the packet stream(s) out on links in accordance with the destination information. Network device 100 may include a controller 110, a set of input/output (I/O) units 120-1, 120-2, . . . , 120-J (where J≥1) (hereinafter referred to collectively as "I/O units 120" and individually as "I/O unit 120"), and a switch fabric 130.

Controller 110 may include a processor, a microprocessor, or some form of hardware logic (e.g., an application specific integrated circuit (ASIC) or a field programmable gate array (FPGA)). In one example implementation, controller 110 may include an Ethernet controller and/or another controller device. Controller 110 may perform high level management functions for network device 100. For example, controller 110 may maintain connectivity and manage information/data necessary for transferring packets by network device 100. Controller 110 may create routing tables based on network topology information, create forwarding tables based on the routing tables, and communicate the forwarding tables to I/O units 120. I/O units 120 may use the forwarding tables to perform route lookup for incoming packets and perform the forwarding functions for network device 100. Controller 110 may also perform other general control and monitoring functions for network device 100.

I/O unit 120 may include a component or collection of components to receive packets, to process incoming and/or outgoing packets, and/or to transmit outgoing packets. For example, I/O unit 120 may include I/O ports, a packet forwarding component, an Ethernet interface and/or another type of interface, a central processing unit (CPU), and/or a memory device. I/O unit 120 may include a collection of ports that receive or transmit packets via physical links. The packet forwarding component may include packet processing component(s), switch interface component(s), Internet processor component(s), memory device(s), etc.

Each of I/O units 120 may be connected to controller 110 and switch fabric 130. I/O units 120 may receive packet data on physical links connected to a network, such as a wide area network (WAN) or a local area network (LAN). Each physical link could be one of many types of transport media, such as an optical fiber or an Ethernet cable.

I/O units 120 may process incoming packet data prior to transmitting the data to another I/O unit 120 or the network. I/O units 120 may perform route lookups for the data using the forwarding table from controller 110 to determine destination information. If the destination indicates that the data should be sent out on a physical link, connected to I/O unit 120, then I/O unit 120 may prepare the data for transmission by, for example, adding any necessary headers and/or modifying existing headers, and/or transmitting the data from the port associated with the physical link. If the destination indicates that the data should be sent to another I/O unit 120 via switch fabric 130, then I/O unit 120 may, if necessary, prepare the data for transmission to the other I/O unit 120 and/or may send the data to the other I/O unit 120 via switch fabric 130.

Switch fabric 130 may include one or multiple switching planes to facilitate communication among I/O units 120 and/or controller 110. In one implementation, each of the switching planes may include a single-stage switch or a multi-stage switch of crossbar elements. Switch fabric 130 may also, or alternatively, include processors, memories, and/or paths that permit communication among I/O units 120 and/or controller 110.

Although, FIG. 1 illustrates example components of network device 100, in other implementations, network device 100 may include additional components, fewer components, different components, or differently arranged components than those illustrated in FIG. 1 and described herein. Additionally, or alternatively, one or more operations described as being performed by a particular component of network device 100 may be performed by one or more other components, in addition to or instead of the particular component of network device 100.

Figure 2:
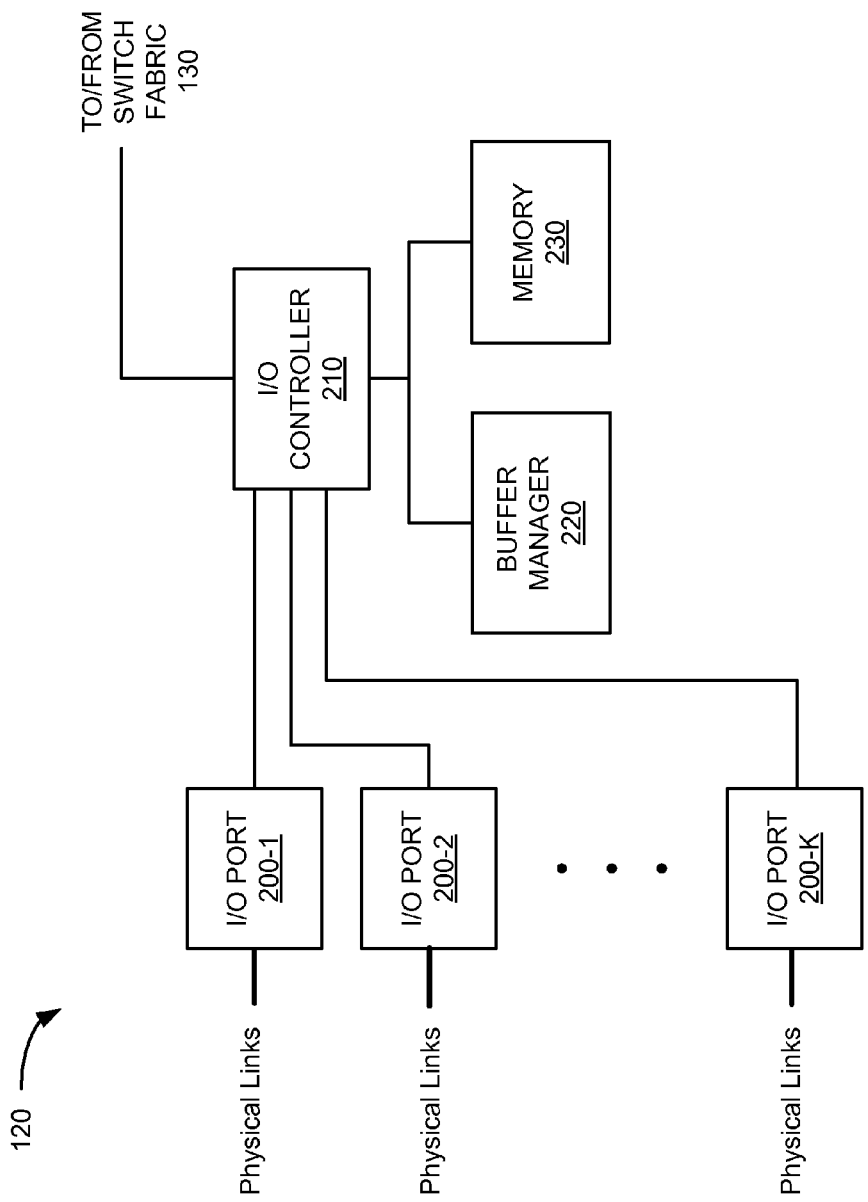
FIG. 2 is a block diagram illustrating an example portion of the network device shown in FIG. 1.

FIG. 2 is a block diagram illustrating example components of I/O unit 120. As illustrated in FIG. 2, I/O unit 120 may include a set of input/output ports 200-1, 200-2, . . . , 200-K (where K≥1) (hereinafter referred to collectively as "I/O ports 200" and individually as "I/O port 200"), an input/output (I/O) controller 210, a buffer manager 220, and a memory 230.

I/O ports 200 may be a point of attachment for a physical link and/or may include a component to receive, transmit, and/or process packets on a network link. For example, I/O ports 200 may include an Ethernet interface, an organizational charting (OC) interface, an asynchronous transfer mode (ATM) interface, or another type of interface. I/O ports 200 may include a variety of physical interfaces via which packets can be received, can be transmitted, or can be received and transmitted. I/O ports 200 may transmit data between a physical link and I/O controller 210. In one implementation, each of I/O ports 200 may be a physical interface card (PIC). Different I/O ports 200 may be designed to handle different types of network links. For example, one of I/O ports 200 may be an interface for an optical link while another of I/O port 200 may be an interface for an Ethernet link, implementing any of a number of well-known protocols.

For incoming data, in one implementation, I/O ports 200 may remove layer 1 (L1) protocol information and forward the remaining data, such as raw packets, to I/O controller 210. For outgoing data, I/O ports 200 may receive packets from I/O controller 210, encapsulate the packets in L1 protocol information, and transmit the data on the physical link or "wire."

I/O controller 210 may include a processor, a microprocessor, or some form of hardware logic (e.g., an ASIC or a FPGA). In one example implementation, I/O controller 210 may include an Ethernet controller and/or another controller device. I/O controller 210 may perform packet forwarding functions and handle packet transfers to and/or from I/O ports 200 and switch fabric 130. For example, I/O controller 210 may perform route lookups, classification of packets (e.g., for security purposes), policy-based routing, quality of service (QoS) routing, filtering of packets, and other forms of packet processing (e.g., packet statistical processing, accounting, and/or encapsulation). I/O controller 210 may send requests for memory resources to buffer manager 220 that enables I/O controller 210 to retrieve and/or to temporarily store packet information in memory 230. I/O controller 210 may perform one or more packet processing operations (e.g., packet parsing, route lookup, packet rewriting, nexthop determinations, K-Tree determinations, and/or firewall determinations) based on microinstructions. The microinstructions may be generated by compiling source code for an application or part of an operation system (OS), such as, for example, Juniper Operating System (JUNOS), Cisco Internet Operating System (IOS), and the like. I/O controller 210 may execute the microinstructions in one or more processes or threads.

Buffer manager 220 may include a processor, a microprocessor, or some form of hardware logic (e.g., an ASIC or a FPGA) and/or a component or collection of components to manage memory resources for I/O controller 210. For example, buffer manager 220 may receive a request for memory resources from I/O controller 210 and may identify a storage location, within memory 230, at which packet information may be temporarily stored. Buffer manager 220 may manage resources associated with memory 230 by performing searches to identify unallocated segments (e.g., available storage space) within memory 230 within which to store packet information. Buffer manager 220 may send, to I/O controller 210, address information associated with the location of the available storage space. In another example, buffer manager 220 may update allocation information and/or deallocation information, associated with memory 230, when I/O controller 210 stores new packet information in memory 230 and/or reads packet information from memory 230.

Memory 230 may include a component or set of components that are capable of writing, storing, and/or reading information. Memory 230 may include a memory device or group of memory devices, a processor, a microprocessor, or some form of hardware logic (e.g., an ASIC or a FPGA). For example, memory 230 could be a reduced latency dynamic random access memory (RLDRAM) that may include a memory component (e.g., an integrated circuit configured to read, to write, and/or to store packet information). In another example, memory 230 could be a dynamic random access memory (DRAM) and/or some other form of random access memory (RAM) that may include a memory component configured to read, to write and/or to store packet information (e.g., fixed and/or variable length packets, header information, etc.).

Memory 230 may communicate with I/O controller 210 and/or buffer manager 220 to write, to store, and/or to read packet information. For example, memory 230 may receive packet information and may write the packet information into an available memory location (e.g., an unallocated segment). Memory 230 may respond to read requests from I/O controller 210 and/or buffer manager 220 and may retrieve and/or forward packet information to I/O controller 210 and/or buffer manager 220.

Although, FIG. 2 illustrates example components of I/O unit 120, in other implementations, I/O unit 120 may include additional components, fewer components, different components, or differently arranged components than those illustrated in FIG. 2 and described herein. Additionally, or alternatively, one or more operations described as being performed by a particular component of I/O unit 120 may be performed by one or more other components, in addition to or instead of the particular component of I/O unit 120.

Figure 3:
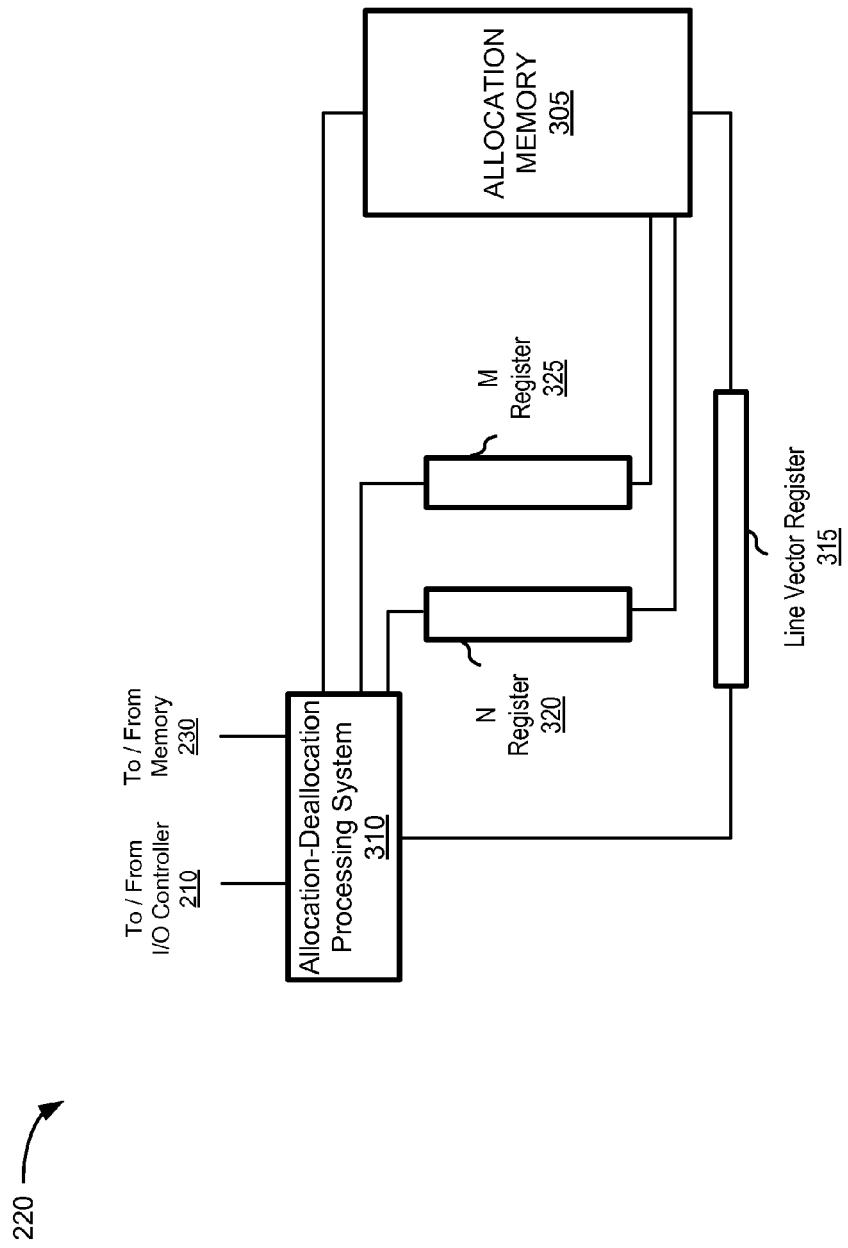
FIG. 3 is a block diagram showing example components a portion of the network device shown in FIG. 1.

FIG. 3 is a block diagram showing example components of buffer manager 220. The components illustrated in FIG. 3 may be implemented by hardware or a combination of hardware and software. Buffer manager 220 may include an allocation memory 305, an allocation-deallocation processing system (APS) 310, a line vector register 315, a N register 320, and a M register 325.

Allocation memory 305 may include a component or set of components that are capable of writing, storing, and/or reading information. Allocation memory 305 may include a memory device or group of memory devices, a processor, a microprocessor, or some form of hardware logic (e.g., an ASIC or a FPGA). In one example implementation, allocation memory 305 may be a static random access memory (SRAM) that may include a memory component (e.g., an integrated circuit configured to read, to write, and/or to store data). Allocation memory 305 may store an allocation bit for each segment of storage space associated with memory 230. For example, allocation memory 305 may mark an allocation bit as allocated (e.g., by setting the allocation bit to a particular value, such as "1") when a memory segment, to which the allocation bit corresponds, is not available (e.g., is storing packet information and/or has been marked as unavailable). In another example, allocation memory 305 may mark an allocation bit as unallocated (e.g., by setting the allocation bit to another particular value, such as "0"), when a memory segment to which the allocation bit corresponds is available (e.g., is not storing packet information and/or has otherwise been marked as available).

Allocation memory 305 may store summary bits that may correspond to the allocation bits. For example, allocation memory 305 may store a quantity of summary bits, where each summary bit corresponds to a particular quantity of allocations bits (e.g., 16, 32, 64, 128, etc.). In one example, the particular quantity of allocation bits may correspond to a row of segments within memory 305. In another example, the quantity of summary bits may correspond to a quantity of rows within memory 305. The summary bits may further reduce a time associated with performing a search, a quantity of clock cycles associated with performing the search, a size of the search (e.g., a quantity of bits to be searched), and/or a quantity of steps associated with the search to identify available memory locations within memory 230. The particular quantity of allocation bits to which a summary bit corresponds may be set via hardware, codified via software, and/or be selected by a user of network device 100.

APS 310 may include a processor, a microprocessor, or some form of hardware logic (e.g., an ASIC or a FPGA) and/or a component or collection of components to process incoming requests for memory resources, and/or to handle data write requests and/or data read requests. For example, APS 310 may include a CPU, a memory device, packet processing component(s), switch interface component(s), etc. APS 310 may, for example, receive a request from I/O controller 210 for memory resources associated with memory 230 and APS 310 may provide memory pointers associated with storage locations within memory 230 in which packet information can be stored. APS 310 may monitor and/or control allocations and deallocations of memory space associated with memory 230. For example, APS 310 may instruct memory 305 to set allocation bits and/or summary bits (e.g., to 0 or 1) based on whether corresponding segments, read from memory 230, are available or not available. Additionally, or alternatively, APS 310 may monitor changes in state of the segments to ensure that allocation bits and/or summary bits are updated periodically (e.g., on each clock cycle or within a particular quantity of clock cycles). For example, when I/O controller 210 causes packet information to be written to a segment, within memory 230, APS 310 may cause a corresponding allocation bit and/or summary bit to be marked as allocated (e.g., set from "0" to "1" or vice versa). In another example, when I/O controller 210 causes packet information to be read from a segment, within memory 230, APS 310 may cause a corresponding allocation bit and/or summary bit to be marked as unallocated (e.g., set from "1" to "0" or vice versa). Marking the bits as unallocated may be performed the first time the packet information is read from the memory segment or after a quantity of reads (e.g., greater than a threshold) from the memory segment have occurred.

APS 310 may perform searches of summary bits and/or allocation bits to identify one or more locations, within memory 230, at which available memory space may be used to store packet information. In one example, APS 310 may perform a search of summary bits to identify an unallocated summary bit that corresponds to a set of allocation bits that includes one or more unallocated allocation bits or includes at least a quantity of unallocated allocation bits that exceeds a threshold (e.g., a threshold associated with N register 320 and/or M register 325, described below). Based on the search of the summary bits, APS 310 may perform a search of the set of allocation bits to identify an unallocated allocation bit. The unallocated allocation bit may correspond to a segment, in memory 230, that is available to store packet information from I/O controller 210. Based on the search, APS 310 may generate a memory location pointer, based on the unallocated summary bit and/or the unallocated allocation bit, that enables APS 310 to read the identified set of allocation bits from allocation memory 305. APS 310 may store the memory location pointer and/or the identified set of allocation bits, as a line vector, in line vector register 315. APS 310 may mark the set of allocation bits, within memory 305, as allocated (e.g., by setting the set of allocation bits to "1"). Marking the set of allocation bits ensures that the available segments (e.g., within memory 230) that correspond to the set of allocation bits, are not be used except when allocated by APS 310 in response to allocation requests from I/O controller 210.

For example, at a later point in time when APS 310 receives a request for memory resources, APS 310 may not perform another search. Rather, APS 310 may select, from the line vector, a next unallocated allocation bit. APS 310 may, for example, use the memory location pointer and a pointer associated with the next unallocated allocation bit (e.g., based on a position of the next unallocated allocation bit within the quantity of allocation bits) to generate a memory pointer associated with an available segment within memory 230.

Line vector register 315 may include a component or set of components that are capable of writing, storing, and/or reading information. Line vector register 315 may include a memory device or group of memory devices. In one example implementation, line vector register 315 may be a register that may include a collection of flip flops that are each capable of storing one bit of information (e.g., an allocation bit, an address bit, etc.). Line vector register 315 may, for example, store a location pointer and/or a set of allocation bits that correspond to a collection of addresses at which available memory resources (e.g., available segments), within memory 230 are located. Line vector register 315 may be sized to enable line vector register 315 to store a unique address for each allocation bit stored in allocation memory 305 and/or each corresponding segment stored in memory 230. In one example, if allocation memory 305 stores 80,000 allocation bits (e.g., that correspond to segments stored within memory 230), then line vector register 315 may be sized to store at least seventeen (17) bits (e.g., according to the formula: $2^S \geq B$, where S is the quantity of bits within line vector 315 and B is the quantity of allocation bits stored in allocation memory 305).

N Register 320 may include a component or set of components that are capable of writing, storing, and/or reading information. N register 320 may include a memory device or group of memory devices. In one example implementation, N register 320 may be a register that may include a collection of flip flops that are each capable of storing one bit of information (e.g., a summary bit). N Register 320 may, for example, store summary bits that may be used, by APS 310, when performing a search for available memory space, within memory 230, to identify at least a particular quantity (e.g., at least a quantity of N) of unallocated allocation bits. The particular quantity may be set (e.g., where $1 \leq N \leq LV$, where LV is a quantity of allocation bits stored by line vector register 315) in order to reduce the quantity of searches performed by APS 310 and/or to reduce utilization of bandwidth resources, processing time, and/or processing capacity associated with the searches.

Additionally, or alternatively, the particular quantity may be set in order to balance a desire to reduce a quantity and/or frequency of search operations with another desire to efficiently utilize memory space associated with memory 230. On the one hand, if N is set too low (e.g., where N=1), then APS 310 may, for example, identify line vectors that contain as few as one unallocated allocation bit. Setting N too low may cause APS 310 to perform frequent searches (e.g., after each request for memory resources from I/O controller 210) and/or to utilize too much processing time, processing resources, and/or bandwidth based on thresholds thereof. On the other hand, if N is set too high (e.g., N=LV), then the probability that N register 320 may not store any unallocated summary bits (e.g., an unsuccessful search) increases due to large quantities of memory locations not being available. In one example, the particular quantity may be set between a minimum value (e.g., one) and the maximum value (e.g., LV=64) which reduces the frequency of searches while minimizing unsuccessful searches (e.g., N=6, 8, 10, 12, etc.).

M register 325 may include a component or set of components that are capable of writing, storing, and/or reading information. M register 325 may include a memory device or group of memory devices. In one example implementation, M register 325 may be a register that may include a collection of flip flops that are each capable of storing one bit of information (e.g., a summary bit). M register 325 may, for example, store summary bits that may be used, by APS 310, when performing a search for available memory space, within memory 230, to identify a line vector that includes at least a minimum quantity (e.g., where $1 \leq M \leq N$,) of unallocated allocation bits. M may be set to a minimum quantity that ensures that APS 310 is able to identify at least some (e.g., 1, 2, etc.) memory resources, associated with memory 230, in response to a request received from I/O controller 210. In one example, M may be set to a particular minimum quantity (e.g., M=1).

Although, FIG. 3 illustrates example components of buffer manager 220, in other implementations, buffer manager 220 may include additional components, fewer components, different components, or differently arranged components than those illustrated in FIG. 3 and described herein. Additionally, or alternatively, one or more operations described as being performed by a particular component of buffer manager 220 may be performed by one or more other components, in addition to or instead of the particular component of buffer manager 220.

Example Allocation-Deallocation Configuration

Figure 4:
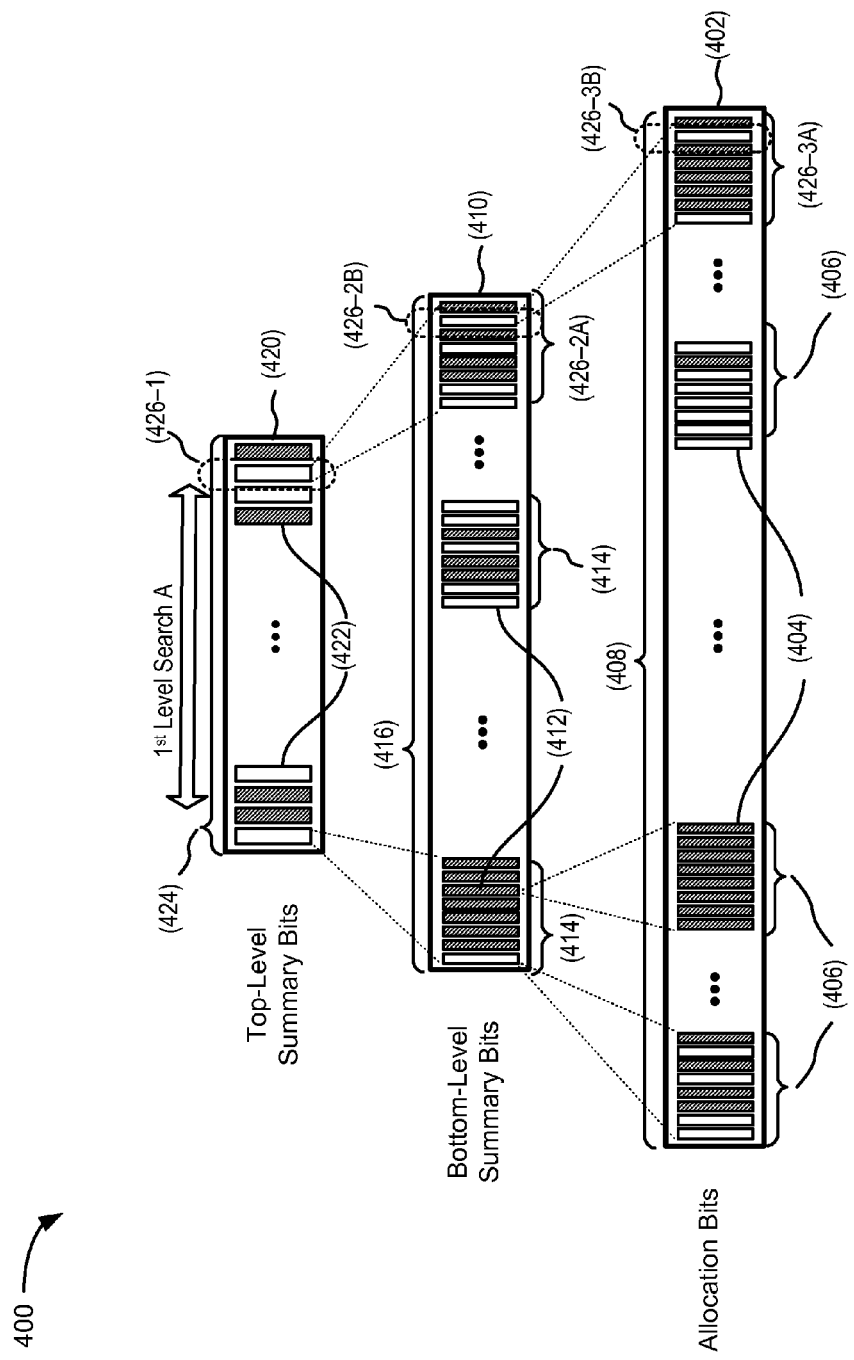
FIG. 4 is a diagram of an example summary bit allocation-deallocation configuration according to an implementation described herein.

FIG. 4 is a diagram of an example allocation-deallocation configuration 400 (hereinafter referred to as "allocation configuration 400") according to an implementation described herein. As illustrated in FIG. 4, allocation configuration 400 may include an allocation bit configuration 402, a bottom-level summary bit configuration 410, and a top-level summary bit configuration 420. Allocation configuration 400, of FIG. 4, includes bit configurations 400-420 for explanatory purposes. In practice, allocation configuration 400 may include additional bit configurations, fewer bit configurations, different bit configurations, and/or differently arranged bit configurations than are described with respect to allocation configuration 400. For example, in another example implementation, allocation configuration 400 may include one or more intermediate-level bit configurations in additional to or instead of allocation bit configuration 402, bottom-level summary bit configuration 410, and/or top-level summary bit configuration 420.

Allocation bit configuration 402 may correspond to a manner in which allocation bits are stored in memory 305. Allocation bit configuration 402 may include a collection of allocation bits 404 (hereinafter referred to collectively as "allocation bits 404" and individually as "allocation bit 404"), a group of allocation-level search arrays 406, and an allocation bit quantity 408. For example, allocation bit 404 may be a bit, stored in memory 305, that corresponds to a segment associated with memory 230. Allocation bit 404 may be marked as allocated (e.g., set to a particular value, such as "1," and is shown as shaded in FIG. 4) when a segment, to which allocation bit 404 corresponds, stores packet information or is otherwise unavailable to store new packet information. In another example, allocation bit 404 may be marked as unallocated (e.g., set to another particular value, such as "0," and is shown as unshaded in FIG. 4) if a segment, to which allocation bit 404 corresponds, does not store packet information and/or is otherwise available to store new packet information.

Allocation-level search array 406 may include a quantity of allocation bits 404 that may be used by APS 310 when performing a search. For example, each allocation-level search array 406 may include a quantity of allocation bits 404 that correspond to a quantity of segments within each row of memory 305. Allocation bit quantity 408 may include a total quantity of allocation bits stored in memory 305. In one example implementation, if memory 230 is an 80 megabit (Mb) memory, then allocation memory 305 may store allocation bit 404 for each segment (e.g., a 1 kilobit (Kb) segment of storage space or 1024 bits) associated with memory 230. In this example, allocation memory 305 may be sized (e.g., based on allocation bit quantity 408) to store approximately an 80 Kb quantity of allocation bits (e.g., 81,920 allocation bits or one allocation bit 404 for each segment of memory space associated with memory 230) and/or other data. In another implementation, allocation memory 305 may store allocation bits 404 corresponding to segments that are different than 1 Kb and/or that correspond to a quantity of segments that are different than one segment.

Allocation bit configuration 402 may be used to simplify a search to identify available storage space within memory 230. Allocation bits 404, as described above, may reduce the search space (e.g., from 80 Mb to 80 Kb), an amount of time (e.g., and/or quantity of clock cycles associated with network device 100) to perform the search, and/or a quantity of bandwidth utilization associated with performing the search.

Bottom-level summary bit configuration 410 may correspond to a manner in which bottom-level summary bits are stored in memory 305, M register 325, and/or N register 320. Bottom-level summary bit configuration 410 may include a group of bottom-level summary bits 412 (hereinafter referred to collectively as "bottom-level summary bits 412" and individually as "bottom-level summary bit 412"), a group of bottom-level search arrays 414, and a bottom-level summary bit quantity 416.

Bottom-level summary bit 412 may correspond to a particular quantity of allocation bits 404 associated with a particular allocation-level search array 406. In one example, bottom-level summary bit 412 may correspond to allocation bits 404, stored in a particular row of entries within allocation memory 305 (e.g., a row of 16, 32, 64, etc.), where the quantity of allocation bits 404 in the row is identified by allocation-level search array 406.

Bottom-level summary bit 412 may be marked as allocated (e.g., set to a particular value, such as "1," and as shown as shaded in FIG. 4) when a quantity of allocation bits 404 (e.g., a quantity that is less than a threshold), associated with the particular allocation-level search array 406, are marked as unallocated. For example, bottom-level summary bit 412 may be marked as allocated when all allocation bits 404, associated with the particular allocation-level search array 406, are marked as allocated. In another example implementation, the threshold by which bottom-level summary bit 412 is marked as allocated may be based on whether bottom-level summary bit 412 is associated with another summary bit (e.g., top-level summary bit 422) stored in N register 320 or M register 325. For example, if bottom-level summary bit 412 is associated with M register 325, then bottom-level summary bit 412 may be marked as allocated when less than a minimum quantity (e.g., M=1, 2, etc.) of allocation bits 404, associated with the particular allocation-level search array 406, are marked as unallocated. In another example, if bottom-level summary bit 412 is associated with N register 320, then bottom-level summary bit 412 may be marked as allocated when less than a particular quantity (e.g., N=6, 8, etc.) of allocation bits 404, associated with the particular allocation-level array 406, are marked as unallocated.

Bottom-level summary bit 412 may be marked as unallocated (e.g., set to another particular value, such as "0," and as shown as unshaded in FIG. 4) when at least a quantity of allocation bits 404 (e.g., a quantity that is greater than the threshold), associated with the particular allocation-level search array 406, are marked as unallocated. For example, bottom-level summary bit 412 may be marked as unallocated when at least one allocation bit 404, associated with the particular allocation-level search array 406, is marked as unallocated. In another example implementation, the threshold by which bottom-level summary bit 412 is marked as unallocated may be based on whether bottom-level summary bit 412 is associated with another summary bit (e.g., top-level summary bit 422) stored in N register 320 or M register 325. For example, if bottom-level summary bit 412 is associated with M register 325, then bottom-level summary bit 412 may be marked as unallocated when a quantity of unallocated allocation bits 404, associated with the particular allocation-level search array 406, is greater than a minimum quantity (e.g., M=1, 2, etc.) of allocation bits 404. In another example, if bottom-level summary bit 412 is associated with N register 320, then bottom-level summary bit 412 may be marked as unallocated when a quantity of unallocated allocation bits 404, associated with the particular allocation-level array 406, is greater than a particular quantity (e.g., N=6, 8, etc.), are marked as unallocated.

Bottom-level search array 414 may include a quantity of bottom-level summary bits 412 that may be used by APS 310 when performing a search. Bottom-level summary bit quantity 416 may include a total quantity of bottom-level summary bits 404 stored in allocation memory 305. For example, allocation memory 305 may store a quantity of bottom-level summary bits 412, where bottom-level summary bit quantity 416 is based on allocation bit quantity 408 and/or allocation-level search array 406 (e.g., BSB≅allocation bit quantity 408/allocation-level search array 406, where BSB is bottom-level summary bit quantity 416). In one example, if allocation memory 305 stores a particular quantity of allocation bits 404 (e.g., 80 Kb) that are associated with a group of allocation-level search arrays 406 (e.g., where each allocation-level search array 406 is associated with 64 allocation bits 404), then the total quantity of bottom-level summary bits 412 may be approximately equal to 1280 (e.g., BSB≅81,920/64≅1280).

In a manner similar to that described above, the bottom-level summary bits 412 may reduce the search space (e.g., from 80 Kb of allocation bits 404 to approximately 1280 bottom-level summary bits 412). Additionally, or alternatively, the period of time (e.g., and/or a quantity of clocks cycles) during which the search is performed and/or a quantity of bandwidth utilization associated with performing the search may be reduced based on the reduction in search space as described above.

Top-level summary bit configuration 420 may correspond to a manner in which top-level summary bits are stored in memory 305, M register 325, and/or N register 320. Top-level summary bit configuration 420 may include a group of top-level summary bits 422 (hereinafter referred to collectively as "top-level summary bits 422" and individually as "top-level summary bit 422") and a top-level search array 424.

Top-level summary bit 422 may correspond to a particular quantity of bottom-level summary bits 412 associated with a particular bottom-level search array 414. Top-level summary bit 422 may, for example, be marked as allocated (e.g., set to a particular value, such as "1," and as shown as shaded in FIG. 4) when all of bottom-level summary bits 412, associated with the particular bottom-level search array 414, are marked as allocated. In another example, top-level summary bit 422 may be marked as unallocated (e.g., set to another particular value, such as "0," and as shown as unshaded in FIG. 4) when at least one bottom-level summary bit 412, associated with the particular bottom-level search array 414, is marked as unallocated.

Top-level search array 424 may include a quantity of top-level summary bits 422 (e.g., stored in allocation memory 305) that may be used by APS 310 when performing a search. In one example, allocation memory 305 may store a quantity of top-level summary bits 422, where top-level search array 424 is based on bottom-level summary bit quantity 416 and/or bottom-level search array 414 (e.g., TSB≅bottom-level summary bit quantity 416/bottom-level search array 414, where TSB is top-level search array 424). In one example, if allocation memory 305 stores a particular quantity (e.g., 1280) of bottom-level summary bits 412 with a particular bottom-level search array 414 (e.g., 32), then the top-level search array 424 may be approximately equal to 40 (e.g., TSB≅1280/32≅40).

In a manner similar to that described above, the top-level summary bits 422 may reduce the search space (e.g., from 1280 bottom-level summary bits 412 to approximately 40 top-level summary bits 422). Additionally, or alternatively, the period of time (e.g., or a quantity of clocks cycles) during which the search is performed and/or a quantity of bandwidth used when performing the search may be reduced based on the reduction in search space as described above.

APS 310 may use allocation configuration 400 to perform a search to identify available memory resources, within memory 230, in response to a request from I/O controller 210. For example, APS 310 may use allocation configuration 400 to perform a multi-level search that includes searching top-level summary bits 422, bottom-level summary bits 412, and/or allocation bits 404. For example, APS 310 may search top-level search array 424 to identify an unallocated top-level summary bit 422 (e.g., as shown by ellipse 426-1) within the group of 40 top-level summary bits 424. APS 310 may record the position of an identified unallocated top-level summary bit 422 within top-level search array 424. The position information may be converted to an address associated with the top-level search (e.g., a string based on $2^S \geq B$, where B is the quantity of bits to be converted and S is a length of converted position information). For example, for the group of 40 top-level summary bits 422, the converted position information may be a top-level address that includes a six-bit string (e.g., where $2^S \geq 40$ when $S \geq 6$).

Based on the top-level search, APS 310 may search a particular bottom-level search array 414 that corresponds to the identified unallocated top-level summary bit 422. For example, APS 310 may search the particular bottom-level search array 414 (e.g., as shown by bracket 426-2A), that includes 32 bottom-level summary bits 412, to identify an unallocated bottom-level summary bit 412 (e.g., as shown by ellipse 426-2B). APS 310 may, for example, record the position of unallocated bottom-level summary bit 412 within the particular bottom-level search array 414. For example, the position information may be converted to a bottom-level address that includes a five-bit string associated with the bottom-level search (e.g., based on $2^S \geq B$, where $2^S \geq 32$ when $S \geq 5$).

Based on the bottom-level search, APS 310 may, for example, identify a particular allocation-level search array 406 (e.g., as shown by bracket 426-3A) that corresponds to the identified unallocated bottom-level summary bit 412. For example, APS 310 may read, from allocation memory 305, allocation bits 404 (e.g., the 64 allocation bits in the example above) associated with the particular allocation-level search array 406.

APS 310 may use the recorded position information obtained as a result of the top-level and bottom-level searches to generate an upper-level address pointer corresponding to a location, within allocation memory 305, where allocation bits 404 (e.g., corresponding to the particular allocation-level search array 406) are stored. APS 310 may, for example, concatenate the top-level address and the bottom-level address to generate the upper-level address (e.g., concatenate the 5-bit and 6-bit strings to form an 11-bit string). Additionally, or alternatively, APS 310 may concatenate allocation bits 404 (e.g., the 64 allocation bits), read from allocation memory 305, with the upper-level address (e.g., to create a 75 bit string based on the 11 bit address and 64 allocation bits) to create a line vector corresponding to segments within memory 230. APS 310 may store the line vector in line vector memory 315. The line vector may, for example, permit APS 310 to generate an address pointer, that corresponds to available memory segments within memory 230, based on unallocated allocation 404 bits stored in the line vector. After reading allocation bits 404 from allocation memory 305, APS 310 may mark allocation bits 404 as allocated (e.g., by causing allocation bits 404 to be set to 1). Marking allocation bits 404 may reserve the underlying memory segments, to which allocation bits 404 correspond, for use by APS 310 when responding to request for memory resources.

For example, APS 310 may receive a request for memory resources from I/O controller 210 and may, in response to the request, identify an unallocated allocation bit 404 (e.g., as shown as ellipse 426-3B) stored in the line vector memory 315. Based on the position of the identified allocation bit 404, APS 310 may convert the position information to an allocation-level address (e.g., based on $2^S \geq B$, where B is the quantity of 64 allocation bits 404). For example, the converted position information may be a six-bit binary string associated with the identified allocation bit 404 (e.g., where $2^S \geq 64$ when $S \geq 6$). APS 310 may mark the identified allocation bit 404, within line vector memory 315, as allocated and may generate a memory pointer associated with memory 230. For example, APS 310 may concatenate the address obtained from the top-level and bottom-level searches (e.g., the 11 bit string) with the allocation-level address (e.g., the six-bit string) to generate a memory pointer (e.g., a 17-bit string) associated with memory 230. The memory pointer may indicate a location, within allocation memory 305, at which the identified allocation bit 404 is located and which corresponds to an available segment, within memory 230, in which to store packet information. APS 310 may forward the memory pointer to I/O controller 210 which enables the packet information to be stored within the segment.

Example Processes

FIG. 5 is a flow chart of an example process 500 for responding to a memory allocation request. In one example implementation, process 500 may be performed by APS 310. In another example implementation, some or all of process 500 may be performed by another component or group of components instead of or including APS 310.

As shown in FIG. 5, process 500 may include receiving a request for memory resources (block 505). Assume that a memory (e.g., allocation memory 305) stores 80 Kb, where each allocation bit corresponds to a segment (e.g., a 1 kb segment or 1024 bits) associated with another memory (e.g., memory 230) in which packet information is to be stored and/or retrieved. Assume further that the memory stores 1280 bottom-level summary bits that correspond to the allocation bits, where each bottom-level summary bit corresponds to a set of allocation bits (e.g., allocation-level search array 406 of FIG. 4) that includes 64 allocation bits. Assume still further, that the memory stores 40 top-level summary bits that correspond to the bottom-level summary bits, where each top-level summary bit corresponds to a set of bottom-level summary bits (e.g., bottom-level search array 414) that includes 32 bottom-level summary bits.

For example, I/O controller 210 may receive packet information (e.g., a packet header, packet data, etc.) and may desire to temporarily store the packet information in memory 230 before causing the packet information to be transmitted via switch fabric 130 and/or I/O port 200. I/O controller 210 may send a request, to APS 310, for memory resources that enable I/O controller 210 to store the packet information in memory 230. APS 310 may receive the request for the memory resources and may initiate operations to identify a memory pointer that includes a storage address associated with an unallocated (e.g., and/or available) segment within memory 230. For example, APS 310 may, in response to the request, perform a search of a line vector, stored within line vector memory 315, to determine whether any allocation bits, that have not been allocated (e.g., that are set to "0"), are stored in the line vector.

As also shown in FIG. 5, if an unallocated allocation bit is stored in the line vector (block 510—YES), then process 500 may include sending a memory pointer, associated with the unallocated allocation bit (block 515). For example, APS 310 may, based on the search of line vector memory 315, identify an allocation bit that has not been allocated (e.g., an allocation bit that is set to "0"). APS 310 may, in a manner similar to that described above (e.g., with respect to FIG. 4), record the position of the identified allocation bit and/or may mark the identified allocation bit as allocated (e.g., by causing the allocation bit to change from "0" to "1"). Additionally, or alternatively, APS 310 may convert the position of the allocation bit, within an allocation bit portion of the line vector (e.g., 64 allocation bits), to an allocation address. In one example, the allocation address may be based on a string (e.g., a 6-bit string based on $2^S \geq B$) in a manner similar to that described above (e.g., with respect to FIG. 4).

APS 310 may, for example, concatenate the allocation address with upper address information that is included in the line vector to generate a memory pointer. The upper address information may be a string obtained as a result of a top-level search and/or a bottom-level search (e.g., based on top-level and bottom-level summary bits, respectively) performed at a prior point in time. The resultant memory pointer may, for example, be a string that includes the upper address information and the allocation address information based on the identified allocation bit. The memory pointer may correspond to a memory location, within memory 230, of a segment that corresponds to the identified allocation bit. APS 310 may send the memory pointer to I/O controller 210 and I/O controller 210 may use the memory pointer to store the packet information in the segment associated with memory 230.

As also shown in FIG. 5, if an unallocated allocation bit is not stored in the line vector (block 510—NO), then process 500 may include searching top-level summary bits to identify an unallocated top-level summary bit (block 520) and/or generating address information based on a position of the top-level summary bit (block 525). For example, APS 310 may determine that all of the allocation bits (e.g., all 64 allocation bits within a line vector) have been allocated (e.g., all 64 allocation bits are set to "1"). Based on the determination, APS 310 may search top-level summary bits stored in allocation memory 305. For example, APS 310 may identify a top-level summary bit that has not been allocated (e.g., is set to "0") and may record the position of the identified top-level summary bit, within the top-level summary bits (e.g., the 40 top-level summary bits within top-level search array 424 of FIG. 4). Using the position of the top-level summary bit, APS 310 may, for example, generate a top-level address associated with the identified top-level summary bit. In one example, the top-level address may be based on a string (e.g., a 6-bit string based on $2^S \geq B$) in a manner similar to that described above (e.g., with respect to FIG. 4).

As further shown in FIG. 5, if additional levels are to be searched (block 530—YES), then process 500 may include searching a portion of next-level summary bits to identify an unallocated next-level summary bit (block 535) and generating address information based on a position of the unallocated next-level summary bit (block 540). For example, APS 310 may determine that additional levels of summary bits (e.g., next-level summary bits) are to be searched in order to identify allocation bits that can be used to identify a memory pointer. Based on the determination, APS 310 may search a group of bottom-level summary bits (e.g., bottom-level search array 414 of FIG. 4 that that includes 32 bottom-level summary bits of the 1280 bottom-level summary bits), stored in allocation memory 305, that correspond to an identified top-level summary bit. For example, APS 310 may identify a bottom-level summary bit that has not been allocated (e.g., is set to "0") and may record the position of the identified bottom-level summary bit, within the bottom-level summary bits (e.g., within the 32 bottom-level summary bits). Using the position of the identified bottom-level summary bit, APS 310 may, for example, generate a bottom-level address associated with the identified bottom-level summary bit. In one example, the bottom-level address may be based on a string (e.g., a 5-bit string based on $2^S \geq B$) in a manner similar to that described above (e.g., with respect to FIG. 4).

As yet further shown in FIG. 5, if additional levels are to be searched (block 530—NO), then process 500 may include reading allocation bits associated with an identified next-level summary bit and storing address information and the read allocation bits in a line vector (block 545). For example, APS 310 may determine that the identified bottom-level summary bit corresponds to allocation bits and/or that additional levels of summary stored in allocation memory 305. In another example implementation, there may be additional levels of summary bits stored in allocation memory 305 that may cause APS 310 to perform additional levels of search. In yet another example implementation, additional levels of summary bit searches may be performed based on searches of summary bits that are stored in N register 320 and/or M register 325, which will be described below (e.g., with respect to FIG. 6).

Based on the determination that additional levels of searches are not to be performed, APS 310 may generate an address based on the top-level address information and the bottom-level address information. In one example, APS 310 may concatenate the top-level address information (e.g., the 6-bit string) and the bottom-level address information (e.g., the 5-bit string) to generate an upper-level address (e.g., an 11-bit string). APS 310 may, for example, use the upper-level address to read a set of allocation bits (e.g., the set of 64 allocation bits included in allocation-level search array 406) from a row, within allocation memory 305, that corresponds to the upper-level address. APS 310 may create a line vector based on the upper-level address and the set of allocation bits and may store the line vector in line vector memory 315. In one example, the line vector may be created when APS 310 concatenates the upper-level address with the set of allocation bits (e.g., to create a 75-bit string).

As still further shown in FIG. 5, process 500 may include marking allocation bits as allocated (block 550). For example, APS 310 may reserve the set of allocation bits, stored in allocation memory 305, to ensure that a set of segments (e.g., within memory 230), to which the set of allocation bits correspond, are not otherwise allocated that would render all or a portion of the set of segments unusable by APS 310 and/or I/O controller 210. In one example, APS 310 may mark the set of allocation bits, stored in allocation memory 305, as allocated (e.g., by causing all of the allocation bits to be set to "1").

As shown in FIG. 5, process 500 may include generating a memory pointer associated with an identified unallocated allocation bit (block 555) and sending a memory pointer in response to the request for memory resources (block 560). For example, APS 310 may perform a search of a line vector, stored within line vector memory 315, to identify an allocation bit, that has not been allocated (e.g., that is set to "0"). When APS 310 identifies an allocation bit that has not been allocated, APS 310 may record the position of the identified allocation bit, in a manner similar to that described above (e.g., with respect to block 515). APS 310 may also mark the identified allocation bit as allocated (e.g., by causing the identified allocation bit to be set from "0" to "1") to reserve a segment, stored in memory 230, to which the marked allocation bit corresponds.

Additionally, or alternatively, APS 310 may convert the position of the identified allocation bit, within an allocation bit portion of the line vector (e.g., 64 allocation bits), to an allocation address. In one example, the allocation address may be based on a string (e.g., a 6-bit string based on $2^S \geq B$) in a manner similar to that described above (e.g., with respect to FIG. 515).

APS 310 may, for example, generate a memory pointer based on the allocation address and upper-level address. In one example, APS 310 may concatenate the upper-level address (e.g., an 11-bit string) with the allocation address (e.g., a six-bit string) to generate the memory pointer. The resultant memory pointer may, for example, be a string (e.g., a 17-bit string) that includes the upper-level address (e.g., the 11-bit string) and the allocation address (e.g., the 6-bit string).

The memory pointer may correspond to a memory location, within memory 230, of a segment that is associated with the identified allocation bit. APS 310 may send the memory pointer to I/O controller 210 and I/O controller 210 may use the memory pointer to store the packet information in the segment associated with memory 230.

FIG. 6 is a flow chart of another example process for responding to an allocation request. In one example implementation, process 600 may be performed by APS 310. In another example implementation, some or all of process 600 may be performed by another component or group of components instead of or including APS 310.

As shown in FIG. 6, process 600 may include receiving a request for memory resources (block 605). Assume that a memory (e.g., allocation memory 305) stores 80 Kb, where each allocation bit corresponds to a segment (e.g., a 1 Kb segment or 1024 bits) associated with another memory (e.g., memory 230) in which packet information is to be stored and/or retrieved. Assume further that the memory stores 1280 bottom-level summary bits that correspond to the allocation bits, where each bottom-level summary bit corresponds to a set of allocation bits (e.g., allocation-level search array 406 of FIG. 4) that includes 64 allocation bits.

Assume yet further, that M register 325 stores 40 top-level summary bits that correspond to the bottom-level summary bits, where each top-level summary bit corresponds to a set of bottom-level summary bits (e.g., bottom-level search array 414) that includes 32 bottom-level summary bits. The 40 top-level summary bits may be marked as unallocated on an occurrence of some event. The event may occur when a quantity of allocation bits (e.g. associated with an unallocated top-level summary bit within M register 325) that have not been allocated is greater than a minimum threshold X. For the purpose of the description herein, assume X=2.

Assume still further, that N register 320 stores the 40 top-level summary bits, which may be marked as unallocated on an occurrence of some particular event. The particular event may occur when a quantity of allocation bits (e.g. associated with an unallocated top-level summary bit within N register 320) that have not been allocated is greater than a particular threshold Y. For the purpose of the description herein, assume Y=8.

For example, I/O controller 210 may receive packet information (e.g., a packet header, packet data, etc.) and may desire to temporarily store the packet information in memory 230 before causing the packet information to be transmitted via switch fabric 130 and/or I/O port 200. I/O controller 210 may send a request, to APS 310, for memory resources that enable I/O controller 210 to store the packet information in memory 230. APS 310 may receive the request for the memory resources and may initiate operations to identify a memory pointer that includes a storage address (e.g., a memory pointer) associated with an unallocated (e.g., and/or available) segment within memory 230. For example, APS 310 may, in a manner similar to that described above (e.g., with respect to block 505 of FIG. 5), perform a search of line vector memory 315 to determine whether any allocation bits, that have not been allocated (e.g., that are set to "0"), are stored in line vector memory 315.

As also shown in FIG. 6, if an unallocated allocation bit is stored in the line vector (block 610—YES), then process 600 may include sending a memory pointer, associated with the unallocated allocation bit (block 615). For example, APS 310 may, in a manner similar to that described above (e.g., with respect to blocks 510—YES and 515 of FIG. 5), identify an allocation bit that has not been allocated, record the position of the unallocated allocation bit, and/or generate an allocation address based on the position of the unallocated allocation bit. Additionally, or alternatively, APS 310 may generate a memory pointer based on upper address information (e.g., obtained as a result of a top-level and/or a bottom-level search at a prior point in time) and the allocation address. APS 310 may send the memory pointer to I/O controller 210 that enables I/O controller 210 to store the packet information in memory 230.

As also shown in FIG. 6, if an unallocated allocation bit is not stored in the line vector (block 610—NO), then process 600 may include searching top-level summary bits stored in N register 320 (block 620). For example, APS 310 may determine that all of the allocation bits have been allocated (e.g., all 64 allocation bits, stored in line vector memory 315 have been set to "1"). Based on the determination, APS 310 may search top-level summary bits stored in N register 320 to determine whether any of the top-level summary bits, stored in N register 320, have not been allocated.

As further shown in FIG. 6, if an unallocated top-level summary bit is stored in N register 320 (block 625—YES), the process 600 may include performing acts in a manner similar to that described above (e.g., with respect to blocks 535-560 of FIG. 5). For example, APS 310 may, based on a search of N register 320, identify a top-level summary bit that has not been allocated (e.g., is set to "0"). APS 310 may, for example, record the position of the identified top-level summary bit within the top-level summary bits stored in N register 320. Using the position of the top-level summary bit, APS 310 may generate a top-level address associated with the identified top-level summary bit. In one example, the top-level address may be based on a string (e.g., a 6-bit string based on $2^S \geq B$) in a manner similar to that described above (e.g., with respect to FIG. 4).

APS 310 may, in a manner similar to that described above (e.g., with respect to blocks 535-560 of FIG. 5), perform a search of bottom-level summary bits (e.g., stored in allocation memory 305) that correspond to the identified top-level summary bit stored in N register 320 to identify an unallocated bottom-level summary bit. Based on the bottom-level search, APS 310 may generate an upper-level address based on position information associated with the top-level summary bit and the bottom-level summary bit. APS 310 may use the upper-level address to read, from allocation memory 305, a set of allocation bits, associated with the bottom-level summary bit. The read allocation bits may include a quantity of unallocated allocation bits that is greater than a particular threshold (e.g., Y=8).

APS 310 may store the upper-level address and the read allocation bits, as a line vector, in line vector memory 315 and may mark the allocation bits, stored in allocation memory 305, as allocated (e.g., by causing all of the allocation bits to be set to "1"). Additionally, or alternatively, APS 310 may identify (e.g., within line vector memory 315) an allocation bit that has not been allocated, may record the position of the unallocated allocation bit, and/or generate an allocation address based on the position of the unallocated allocation bit. APS 310 may generate a memory pointer based on upper address information and the allocation address and may send the memory pointer to I/O controller 210. I/O controller 210 may receive the memory pointer and may use the memory pointer to store packet information in a segment, associated with memory 230, that corresponds to the memory pointer.

As yet further shown in FIG. 6, if an unallocated top-level summary is not identified within N register 320, (block 625—NO), then process 600 may include searching top-level summary bits stored in M register 325 (block 625). For example, APS 310 may determine that all of the top-level summary bits, stored in N register 320, have been allocated (e.g., all 40 top-level summary bits, stored in N register 320 have been set to "1"). Based on the determination, APS 310 may search top-level summary bits stored in M register 325 to determine whether any of the top-level summary bits, stored in M register 325, have not been allocated.

As further shown in FIG. 6, if an unallocated top-level summary bit is stored in M register 325 (block 635—YES), then process 600 may include performing acts in a manner similar to that described above (e.g., with respect to blocks 535-560 of FIG. 5). For example, APS 310 may, based on a search of M register 325, identify a top-level summary bit that has not been allocated (e.g., is set to "0"). APS 310 may, for example, record the position of the identified top-level summary bit within the top-level summary bits stored in M register 325. Using the position of the top-level summary bit, APS 310 may generate a top-level address associated with the identified top-level summary bit.

APS 310 may, in a manner similar to that described above (e.g., with respect to blocks 535-560 of FIG. 5), perform a search of bottom-level summary bits (e.g., stored in allocation memory 305) that correspond to the identified top-level summary bit stored in M-register 325 to identify an unallocated bottom-level summary bit. Based on the bottom-level search, APS 310 may generate an upper-level address based on position information associated with the top-level summary bit and the bottom-level summary bit. APS 310 may use the upper-level address to read, from allocation memory 305, a set of allocation bits, associated with the bottom-level summary bit. The read allocation bits may include a quantity of unallocated allocation bits that is greater than a minimum threshold (e.g., X=2).

APS 310 may store the upper-level address and the read allocation bits, as a line vector, in line vector memory 315 and may mark the allocation bits, stored in allocation memory 305, as allocated (e.g., by causing all of the allocation bits to be set to "1"). Additionally, or alternatively, APS 310 may identify (e.g., within line vector memory 315) an allocation bit that has not been allocated, may record the position of the unallocated allocation bit, and/or generate an allocation address based on the position of the unallocated allocation bit. APS 310 may generate a memory pointer based on upper-level address and the allocation address and may send the memory pointer to I/O controller 210. I/O controller 210 may receive the memory pointer and may use the memory pointer to store packet information in a segment, associated with memory 230, that corresponds to the memory pointer.

As further shown in FIG. 6, if an unallocated top-level summary bit is not stored in M register 325 (block 635—NO), then process 600 may include performing the acts described above (e.g., with respect to blocks 520-560 of FIG. 5). For example, APS 310 may determine that all of the top-level summary bits, stored in M register 325, have been allocated (e.g., all 40 top-level summary bits, stored in M register 325 have been set to "1"). Based on the determination, APS 310 may perform a top-level search in the manner described above (e.g., with respect to blocks 520 and 525 of FIG. 5) to identify an unallocated top-level summary bit stored in allocation memory 305. APS 310 may generate a top-level address based on a position of the identified top-level summary bit. Based on the top-level search, APS 310 may, in a manner similar to that described above (e.g., with respect to blocks 535 and 540 of FIG. 5), perform a bottom-level search to identify an unallocated bottom-level summary bit stored in allocation memory 305. APS 310 may generate a bottom-level address based on a position of the identified bottom-level summary bit.

In a manner similar to that described above (e.g., with respect to blocks 545 and 550), APS 310 may generate an upper-level address based on the top-level address and the bottom-level address and may use the upper-level address to read a set of allocation bits from allocation memory 305 based on the upper-level address. APS 310 may store, as a line vector, the upper-level address and the read allocation bits in line vector memory 315 and may mark the allocation bits, stored in allocation memory 305, as allocated (e.g., by causing allocation bits to be set to "1").

APS 310 may, in a manner similar to that described above (e.g., with respect to blocks 555-560), identify an allocation bit that has not been allocated (e.g., within line vector memory 305), may record the position of the unallocated allocation bit, and/or may generate an allocation address based on the position of the unallocated allocation bit. APS 310 may generate a memory pointer based on upper address information and the allocation address and may send the memory pointer to I/O controller 210. I/O controller 210 may receive the memory pointer and may use the memory pointer to store packet information in a segment, associated with memory 230, that corresponds to the memory pointer.

CONCLUSION

An implementation described herein may include systems and/or methods for identifying a collection of memory resources (e.g., memory pointers) based on a single search for available (e.g., unallocated) memory resources. The systems and/or methods may receive a request for memory resources and may use one of the identified memory pointers, stored in a line vector, to respond to the request. The collection of memory resources identified based on the single search may reduce a quantity of searches to be performed and/or a quantity of time and/or bandwidth utilization associated with performing searches in response to each request.

An implementation described herein may include systems and/or methods for performing a search for unallocated memory resources when a quantity of memory resources, obtained during a prior search, is no longer available (e.g., have been allocated). The systems and/or methods may receive a request for memory resources and may perform a search to identify available memory segments in which to store packet information. The search may include identifying an unallocated summary bit that enables a group of allocation bits, that correspond to a group of memory segments, to be identified. The systems and/or methods may read, from the memory, the identified allocation bits and may store the identified allocation bits in a line vector. The systems and/or methods may use unallocated allocation bits, stored within the line vector, to generate memory pointers that can be used to respond to requests for memory resources. Using the memory pointers to respond to requests for memory resources, enables the systems and/or methods to reduce a quantity of searches performed, a time associated with performing the searches, and/or a utilization of bandwidth resources associated with performing the searches for the memory resources.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 6, the order of the blocks may be modified in other implementations. Further, non-dependent blocks may be performed in parallel.

References to bits set to "0" or "1" are merely examples. The bits can be set to any value to indicate whether the bits are "allocated" or "unallocated."

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a device, a request to store packet information in a memory associated with the device;
   determining, by the device and based on the request, that an unallocated summary bit is included among a plurality of summary bits,
   the plurality of summary bits including a first summary bit and a second summary bit,
   the first summary bit being adjacent to the second summary bit,
   the first summary bit being the unallocated summary bit,
   the first summary bit corresponding to a first plurality of allocation bits,
   the second summary bit corresponding to a second plurality of allocation bits, and
   the unallocated summary bit indicating that the first plurality of allocation bits include a quantity of unallocated allocation bits that satisfies a threshold;
   generating, by the device and after determining that the unallocated summary bit is included among the plurality of summary bits, a particular address associated with a particular unallocated allocation bit of the first plurality of allocation bits;
   determining, by the device, a storage address based on the particular address; and
   providing, by the device, the storage address to enable storage of the packet information in the memory.

2. The method of claim 1, where generating the particular address includes:
   identifying a position of the particular unallocated allocation bit relative to the first plurality of allocation bits, and
   generating the particular address based on the position of the particular unallocated allocation bit.

3. The method of claim 1,
   where the request is received from an input/output (I/O) component associated with the device,
   where the storage address is provided to the input/output (I/O) component, and
   where the storage address enables the input/output (I/O) component to store the packet information in the memory.

4. The method of claim 1, further comprising:
   identifying an unallocated first-level summary bit based on the unallocated summary bit,
   identifying an unallocated second-level summary bit, of a plurality of second-level summary bits, based on the unallocated first-level summary bit, and
   identifying the first plurality of allocation bits based on the unallocated second-level summary bit before generating the particular address.

5. The method of claim 1, where determining the storage address includes:
   determining the storage address by concatenating the particular address with another address.

6. The method of claim 1, where the plurality of summary bits are stored in a register.

7. The method of claim 1, where the first plurality of allocation bits are stored in another memory that is different from the memory.

8. The method of claim 1, further comprising:
   generating another address associated with the unallocated summary bit; and
   reading the first plurality of allocation bits based on the other address before generating the particular address.

9. The method of claim 8, where generating the other address includes:
   identifying a position of the unallocated summary bit relative to the plurality of summary bits, and
   generating the other address based on the position of the unallocated summary bit.

10. A method comprising:
    identifying, by a device, an unallocated summary bit of a plurality of summary bits,
    the plurality of summary bits including a first summary bit and a second summary bit,
    the first summary bit being adjacent to the second summary bit,
    the first summary bit being the unallocated summary bit,
    the first summary bit corresponding to one or more first allocation bits of a plurality of allocation bits, and
    the second summary bit corresponding to one or more second allocation bits of the plurality of allocation bits;
    identifying, by the device and based on the unallocated summary bit, the one or more first allocation bits; and
    storing, by the device and in a first memory associated with the device, the one or more first allocation bits,
    the one or more first allocation bits corresponding to one or more pointers to one or more unused segments of a second memory associated with the device.

11. The method of claim 10, further comprising:
    reserving the one or more unused segments that correspond to the one or more first allocation bits.

12. The method of claim 10, where identifying the unallocated summary bit of the plurality of summary bits includes:
    determining that an unused pointer is not stored in the first memory, and
    identifying the unallocated summary bit of the plurality of summary bits after determining that the unused pointer is not stored in the first memory.

13. The method of claim 12, where the unused pointer corresponds to a segment, of the second memory, that is available to store packet information.

14. The method of claim 10, further comprising:
    receiving a request for a pointer;

identifying the pointer, of the one or more pointers, based on an unallocated bit of the one or more first allocation bits; and sending information regarding the pointer.

15. The method of claim 14, further comprising:

generating an address based on a position of the unallocated bit relative to other allocation bits of the plurality of allocation bits, the information regarding the pointer including information identifying the address.

16. A device comprising:

one or more processors to:

identify an unallocated summary bit of a plurality of summary bits, the plurality of summary bits including a first summary bit and a second summary bit, the first summary bit being adjacent to the second summary bit, the first summary bit being the unallocated summary bit, the first summary bit corresponding to one or more first allocation bits of a plurality of allocation bits, and the second summary bit corresponding to one or more second allocation bits of the plurality of allocation bits;

identify, based on the unallocated summary bit, the one or more first allocation bits of the plurality of allocation bits; and store, in a first memory associated with the device, the one or more first allocation bits, the one or more first allocation bits corresponding to one or more pointers to one or more unused segments of a second memory associated with the device, and the first memory being different from the second memory.

17. The device of claim 16, where the one or more processors are further to:

reserve the one or more unused segments that correspond to the one or more first allocation bits by marking the one or more first allocation bits as allocated.

18. The device of claim 16, where the one or more processors are further to:

receive a request for a pointer;

identify the pointer, of the one or more pointers, based on an unallocated bit of the one or more first allocation bits; and send information regarding the pointer to permit storage of packet information in a segment of the one or more unused segments.

19. The device of claim 16, where the one or more processors are further to:

reserve the one or more unused segments that correspond to the one or more first allocation bits.

20. The device of claim 16, where, when reserving the one or more unused segments, the one or more processors are to:

mark the one or more first allocation bits as allocated to reserve the one or more unused segments.

* * * * *